July 28, 1959 R. SIEBURG 2,896,511
MACHINE FOR MAKING TENSILE SPECIMENS
Filed July 27, 1956 4 Sheets-Sheet 1

INVENTOR.
ROBERT SIEBURG
BY
H. G. Manning
ATTORNEY

July 28, 1959 R. SIEBURG 2,896,511
MACHINE FOR MAKING TENSILE SPECIMENS
Filed July 27, 1956 4 Sheets-Sheet 2
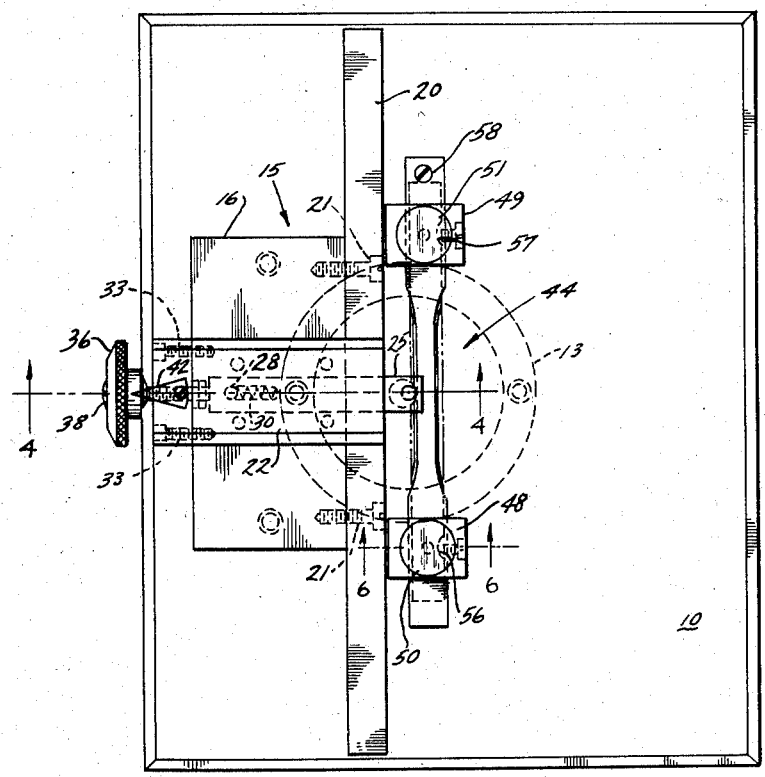
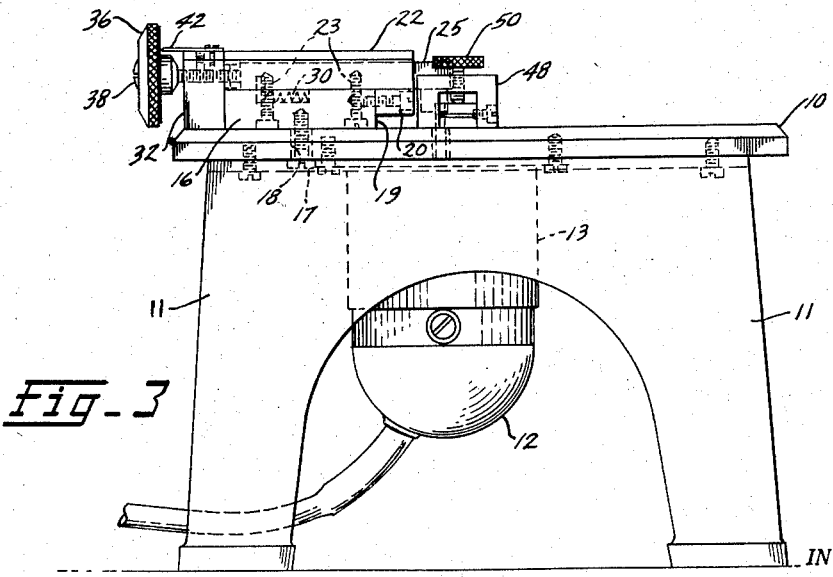
INVENTOR.
ROBERT SIEBURG
BY
H. G. Manning
ATTORNEY

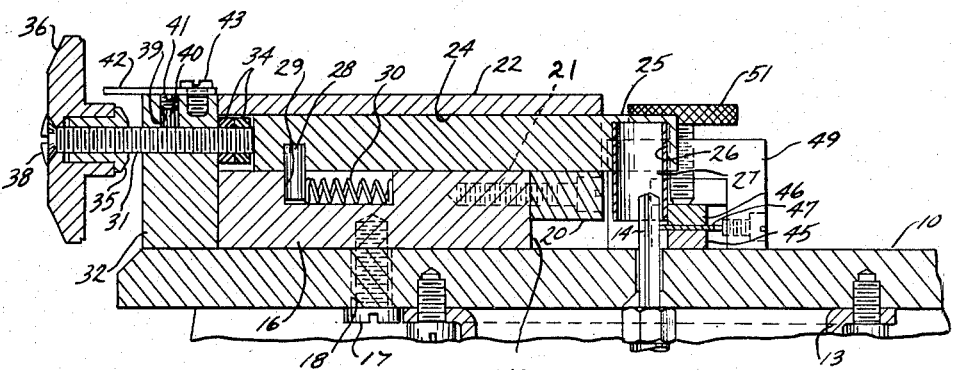
Fig. 4
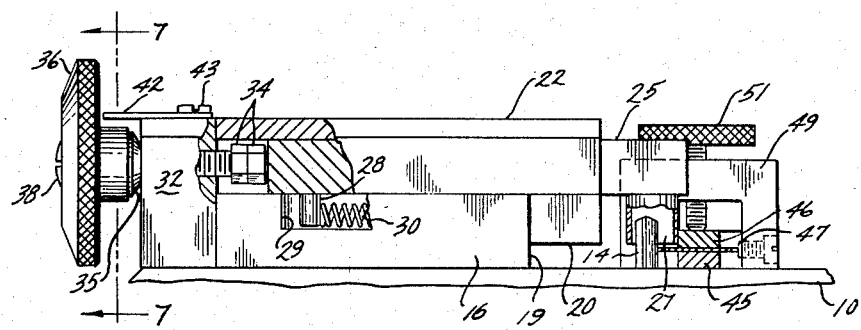
Fig. 5
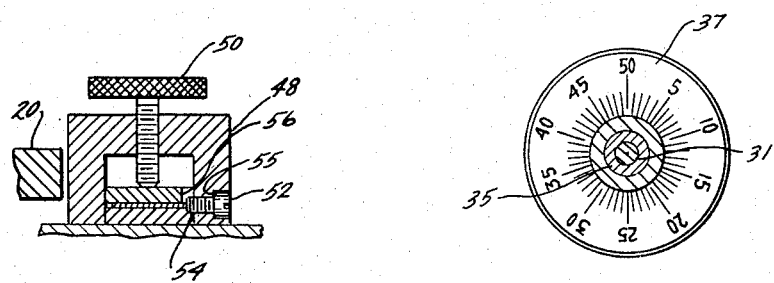
Fig. 6
Fig. 7
INVENTOR.
ROBERT SIEBURG
BY
H. G. Manning
ATTORNEY

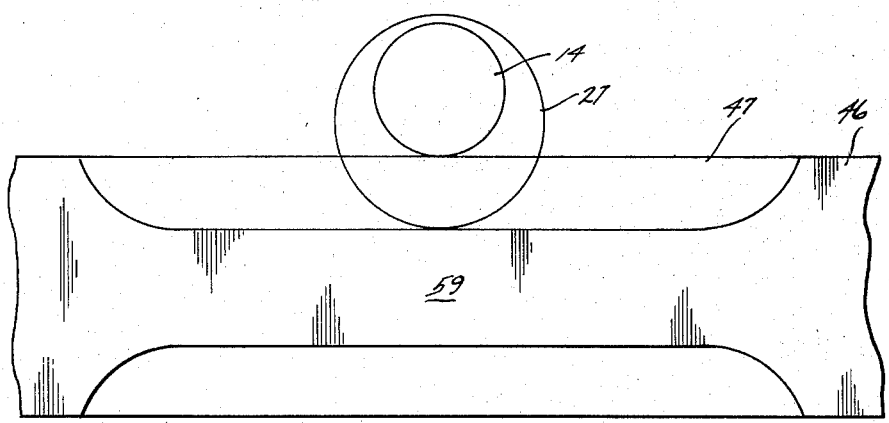
Fig_8
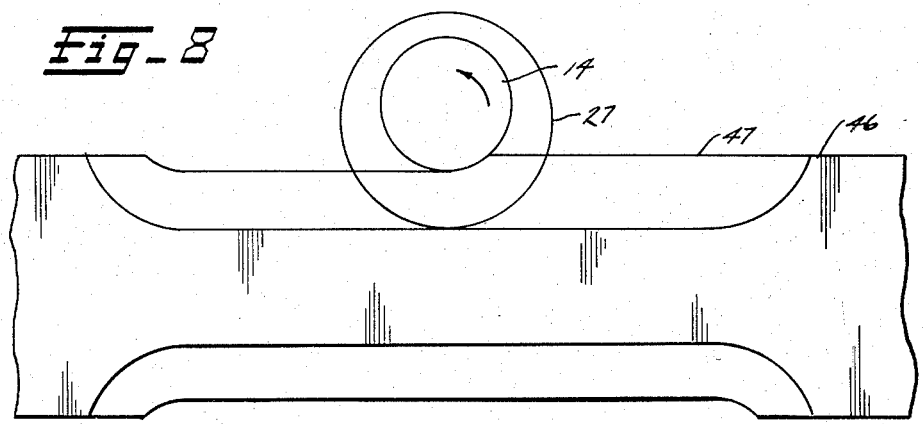
Fig_9
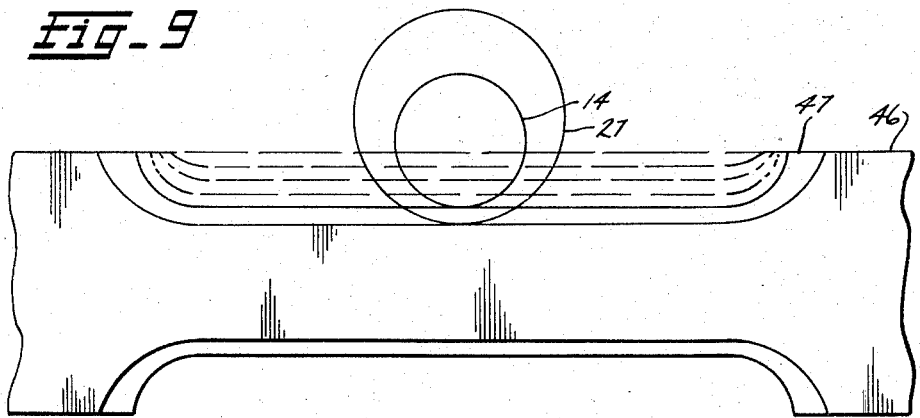
Fig_10
INVENTOR.
ROBERT SIEBURG
BY
H. G. Manning
ATTORNEY United States Patent Office 2,896,511
Patented July 28, 1959

2,896,511

MACHINE FOR MAKING TENSILE SPECIMENS

Robert Sieburg, New Britain, Conn.

Application July 27, 1956, Serial No. 600,443

13 Claims. (Cl. 90—13.2)

This invention relates to machine tools, and more particularly to an apparatus for the precision machining of test specimens required for the physical testing of metallic and non-metallic materials within very close tolerances, including tensile, compressive, impact, and fatigue tests.

Many specific precision shapes and configurations are required for the determination of tensile, compressive, impact, fatigue, and other physical properties of a material.

The actual physical properties of a material, such as tensile strength (expressed as pounds per square inch), and including such other properties as modulus of elasticity, yield strength, and elongation, are the basis for the designing and engineering of all bridges, aircraft, formed parts, such as car fenders, plastic food bags, ballistic missiles, refrigerator, jet engines, and many other products.

The accuracy and reliability of the results of tests for physical properties of sheet materials is directly dependent on the accuracy and precision of the machined test specimens. Considerable skill and care is required to produce accurate test specimens within ASTM specifications.

To accurately determine the values for these physical properties, precise universal standards of size and shape for the test specimens have been set up by such groups as the American Society for Testing Materials, the American Society for Mechanical Engineers, and others. The same standard shape specimens are universally used by the quality control, research, and development laboratories of the prime metal and plastic producers, as well as the manufacturers and consumers to determine that the physical properties are as specified. Precision testing equipment costing many thousands of dollars and highly trained personnel are required to test these specimens and convert the results into specific physical properties, such as "pounds per square inch," percentage elongation, and others.

In the standard procedure for obtaining such accurately shaped specimens, a milling cutter turning at relatively slow speed is used to remove a heavy cut of metal in one continuous pass. A number of superimposed specimens as well as "dummy" back up plates are required to prevent the specimens from deforming at the edges. Moreover, the severity of cold working on the edge of such a specimen is dependent on the sharpness of the cutters, speed of feed, lubrication, etc.

To determine true test results, skilled personnel using precision equipment are dependent on the precision of the test specimen in regard to accuracy of dimension and configuration, the microinch surface finish of the machined edges, and the complete absence of deformation or cold working of the machined edges. Slight variations from the true contour of the specimen (tolerances of plus or minus .0005"), extremely small amounts of cold working or heat distortion of the machined edge, or other small variations of the specimen greatly distort the test results obtained, and yield incorrect results.

In the standard procedure for milling test specimens to shape, a cutter turning at relatively slow speed removes the entire amount of material in one heavy continuous cut. The heavy cutting pressures applied, requires that the samples are securely held on the milling machine bed and must be tightly clamped along with dummy backup plates to prevent deformation of samples while machining. The severity of deformation and cold working on the edges is dependent on the material being machined, the sharpness of the cutters, the skill of the machinist, proper lubrication, the precision of the machine, and many other variables. A considerable amount of time is required to file and hand finish the samples to true dimension and configuration, and to attempt to remove all forms of cold working present on the machined edges created during the milling operation.

In order to overcome the above difficulties, the present machine operates at a high speed of over 20,000 r.p.m., rapidly removing the necessary amount of material in a series of light .0005"–.025" cuts, in such a manner that the cold working of the machined edges is reduced to an insignificant minimum while producing an extremely fine surface finish.

It is the object therefore of the present invention to quickly and accurately machine test specimens to true configuration within tolerances of plus or minus .0005", without deformation, heat distortion, or cold working of the machined edges, and with complete elimination of hand finishing of said machined edges, and yet the precision machining can be accomplished by unskilled personnel.

The machining is accomplished by a series of light cuts with a carbide cutting routing tool, rotating at a high speed of 20,000 to 100,000 r.p.m. Individual machined cuts or shavings from .00025" to .050" in depth are accurately controlled with a micrometer adjustment. The specific depth of cut is dependent on the machinability of the material being machined. The rapid removal of very fine metal or nonmetallic shavings reduces the cutting pressures to a minimum, and the master template containing the sample may conveniently be held by hand without the necessity of clamping to the table top, and with the individual passes requiring a force of only one finger against the template to achieve proper cutting.

This invention allows the dimensions and configuration of the specimens to be controlled and duplicated by the same precision master template within consistent tolerances of plus or minus .0005".

The samples are firmly held in the template until completely machined to the final specimen dimensions, thus eliminating any possible errors caused by reversing the samples as required in standard milling procedure. The dimensional accuracy of the configuration of the finished sample is not dependent on the skill of the operator but is completely controlled by the precision master template; hence an unskilled technician can readily machine accurate specimens with only a few minutes' instructions. Since this accuracy is not dependent on the skill of an operator, but rather on the master template— an unskilled technician can readily produce accurate specimens with only a few minutes' instruction. Such accuracy and consistency of duplication permits accurate and reliable tests to be made of the physical properties of the sheet material. Moreover, tensile specimens may thus be prepared without the development of any substantial amount of heat which might be detrimental to the tests to be made thereon.

The present machine which is moderate in size with a total weight of approximately 25 pounds, is truly portable and may be moved to any desired accessible location in the testing laboratory. This feature combined with the ability to accurately machine single specimens eliminates the many delays normally encountered in such machine work.

The ability to machine with light cuts and low cutting pressures eliminates cold working on the machined edges of metals and eliminates heat distortion on the machined edges of plastics and nonmetallic materials. Extremely tough high temperature "super alloys," such as cobalt base metals or heat-treated stainless steels may be accurately machined in the light .001" foil gauges without any deformation, and also the heavier .250" plate, and the softer metals as lead, copper, aluminum, and magnesium are equally well machined. Soft heat sensitive polyethylene film materials ½ mil thick, or the extremely abrasive glass reinforced laminates ½" thick are accurately machined without heat deformation or delamination of the machined edges.

One object of this invention is to provide an apparatus of the above nature capable of machining the edges of strips of sheet and plate materials to produce contour samples within very closely controlled tolerances, as required by the "ASTM" specifications for testing materials or other similar specifications.

A further specific object of this invention is the ability to machine specimens of entirely different contours by simply changing the master template. There are no time consuming set-up changes or adjustments required to machine different precision shapes as were necessary with milling procedures.

The disclosed machine is simple in construction, is inexpensive in comparison with standard milling machines presently used for the purpose of machining test specimens, is compact, requiring little floor space, is simple to operate by unskilled personnel and yet is safe in operation.

Another object is to provide an apparatus of the above nature which includes a master template which may be made in various sizes, widths, and gauge lengths to accommodate and produce test specimens of most any thickness or shape.

A further object is to provide a master template of the above nature which may be manually held, with a negligible amount of force while machining the test specimen, thus eliminating heavy vises, clamps and other complicated holding mechanisms.

A still further object is to provide a master template of the above nature by which the test specimen may be machined with a series of light cuts by a bit rotating at high speed.

A further object is to provide an apparatus for accurately machining test specimens in which the cutting bit is considerably smaller in size than the guiding sleeve, which is not concentric with the bit.

A further object is to provide a device of the above nature which will be simple in construction, inexpensive to manufacture, easy to install and manipulate, safe in operation even with inexperienced labor, compact, ornamental in appearance, and very efficient and durable in use.

With these and other objects in view, there has been illustrated on the accompanying drawings one form in which the invention may conveniently be embodied in practice.

In the drawings,

Fig. 2 is a plan view of the same.

Fig. 3 is an end elevation of the same.

Fig. 4 is a cross-section on an enlarged scale, taken on the line 4—4 of Fig. 2, with the control knob in its fully "out" position.

Fig. 5 is an end elevation of the housing for the slidable guide member, broken away to show the interior arrangement of parts when the control knob is in its fully "in" position.

Fig. 6 is a cross-section on an enlarged scale, taken on the line 6—6 of Fig. 2.

Fig. 7 is a cross-section, taken on the line 7—7 of Fig. 5, showing the face of the control knob.

Figure 1:
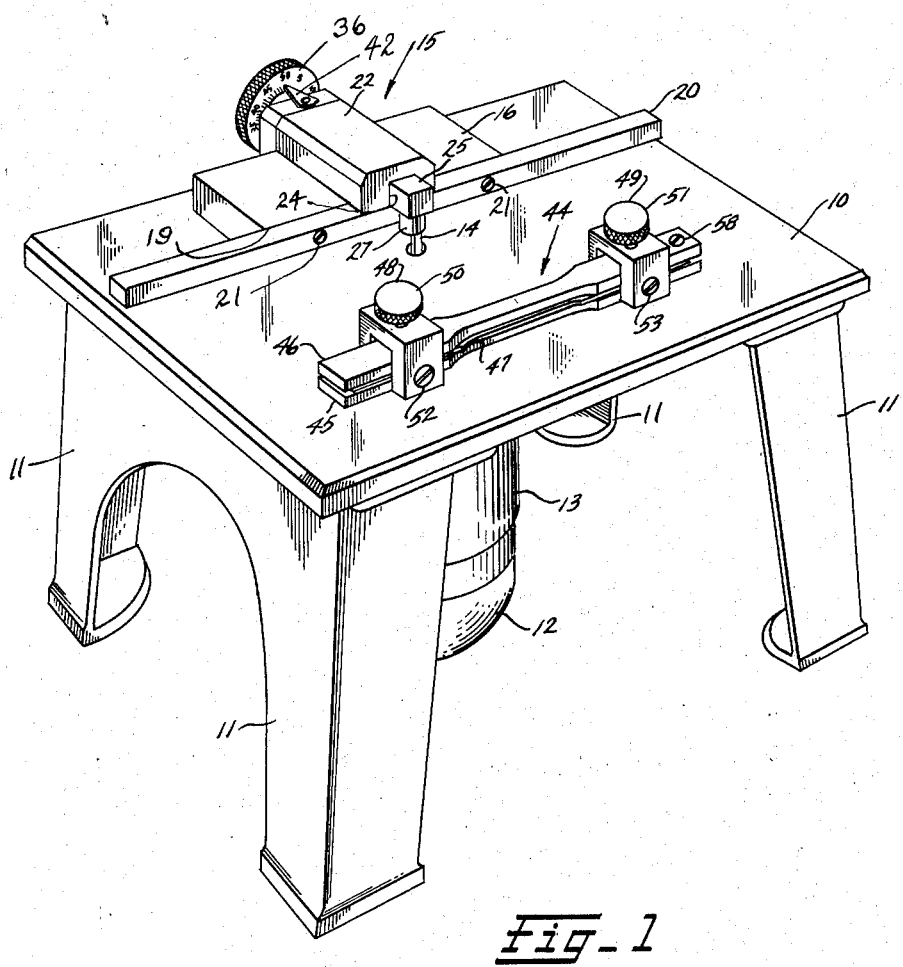
Fig. 1 represents a perspective view of one form of machine for making test specimens, embodying the present invention.

Figs. 8, 9, and 10 are plan views, on a greatly enlarged scale, of a portion of the master template showing the appearance of a test specimen, during successive steps of the machining thereof.

Referring now to the drawings, in which like reference numerals denote corresponding parts throughout the several views, the numeral 10 indicates a flat working table which may be mounted on four corner pedestals 11. An electric or air driven motor 12 is adjustably mounted on a vertical axis in a housing 13 attached to the underside of the work table 10.

The upper end of the shaft of the motor 12 is provided with a chuck, not shown, to removably receive a cylindrical side cutting vertical rotary fluted router bit 14 projecting upwardly through a suitable opening provided in the table 10.

The disclosed invention employs a carbide cutting bit, or similar hard material, with a high rake on the cutting edge allowing these materials to be lightly shaved with low pressures and without disintegration or chipping of the sharp cutting edge of the bit. The same router bit is used for the machining of the softest plastic materials as well as extremely hard high temperature alloys with equally excellent results and without changing the speed of rotation of the cutting tool. This wide versatility is due to the ability to quickly and accurately control the depth of cut for the specific materials being machined.

A guide assembly, generally indicated by the numeral 15, is mounted on a base block 16 comprising a generally rectangular block of metal adjustably secured rigidly to the top of the working table 10 by a pair of fastening bolts having enlarged heads 17, which bolts pass upwardly through the enlarged openings 18 in the table 10 into tapped holes in the underside of the base block 16.

The front side of the base block 16 is provided with a flat vertical surface 19, and a horizontal straight edge bar 20, extending substantially the entire width of the table 10, is rigidly attached, as by means of a plurality of horizontal recessed bolts 21, along the upper portion of the table 10 and spaced a short distance above the surface of said table.

An elongated rectangular cap member 22, which extends from the straight edge bar 20 to the back of the base block 16, is attached thereto by fastening bolts 23 (Fig. 3), extending into the underside of the cap 22 and through suitable openings provided in the base block 16, the heads of said bolts being recessed and engaging the underside of said base block 16.

The underside of the cap member 22 is provided with a longitudinally extending straight sided recess 24. This recess forms, with the top of the base block 16, a slideway having a rectangular cross-section, within which is received an elongated guide bar 25 which projects outwardly forwardly of the bar 20 and overhangs the rotary bit 14, at which location the underside of the guide bar 25 is provided with an upwardly extending circular recess 26, within which is force-fitted a downwardly projecting cylindrical sleeve 27 having an inner diameter substantially greater than the diameter of the bit 14.

At the rear of the guide bar 25, there is provided a downwardly extending stop pin 28, which is received in a recess 29 provided in the top of the base block 16, which recess also accommodates a horizontal helical spring 30, positioned between the stop pin 28 and the front wall of the recess 29, and serving to urge the pin 28 and the guide bar 25 towards the rear of the base block 16. This rearward movement is resisted by an adjusting screw 31, horizontally positioned in a mounting block 32, in such a manner that it abuts in endwise engagement against the rear of the guide bar 25.

The mounting block 32 is secured to the rear face of the cap member 22 by horizontal bolts 33 (Fig. 2) and the longitudinal movement of the adjusting screw 31 may be accurately controlled by means of a pair of lock nuts 34 located on the screw 31 in front of the mounting block 32, and also by a threaded bushing 35 located behind said mounting block.

The bushing 35 is received within the hub of a hand knob 36 having a radially arranged scale 37 (see Fig. 7) on its vertical face, so as to permit an angular "micrometer" adjustment of the position of the scale 37 with respect to the adjusting screw 31; and once the proper setting has been established, the knob 36 will be clamped in place between the bushing 35 and a slotted head 38 of the screw 31.

A passage 39 is drilled downwardly from the top of the mounting block 32 to intersect the adjusting screw 31, and a friction member 40, preferably comprising a small plug of yieldable material, such as plastic, is inserted therein and held under adjustable compression against the threads of the screw 31 by means of a small set screw 41 threaded into the upper end of the passage 39.

A pointer 42 is attached to the top of the mounting block 32 by means of a bolt 43, in alignment with the top of the passage 39 and extending rearwardly into proximity with the scale 37.

A master template, indicated generally by the numeral 44 (Fig. 1), includes an elongated flat upper plate 46 having an accurately specified machined contour, and a similar lower plate 45, between which plates is located a flat strip of test material 47 which is to be machined to the exact contour of the upper plate 46.

A pair of inverted U-shaped clamps 48 and 49 are positioned to straddle the upper and lower plates 46 and 45, near their opposite ends. The depending legs of the clamps 48 and 49 are joined to the sides of the lower plate 45, as by welding, pinning, or otherwise, so that pressure may be exerted on said upper plate 46 by vertical adjustment screws 50 and 51.

Preferably, the inside width between the opposite legs of each of the U-clamps 48 and 49 is such as to easily accommodate with a close sliding fit the widest strip 47 of test material which is expected to be used. For example, in preparing test specimens of metal in accordance with ASTM specifications for sheet metals, the greatest width will be .750".

Means is also provided, whereby narrow test strips may also be accommodated within the master template 44, and for this purpose, a pair of horizontal centering screws 52 and 53 are provided, respectively, for each of the U-clamping members 48 and 49. These screws are threaded into tapped holes extending horizontally through one of the legs of each of the clamps 48 and 49 and in alignment with the plane of the test sample 47. These tapped openings (one of which is indicated at 54, in (Fig. 6), will extend part way into the lower plate 45, and may be counterbored to provide a shoulder 55 to act as a limit stop for the head of the screw 52, it being understood that the length of the shank of said screw will be such that when the screw 52 has reached the point where its head contacts the stop shoulder 55, the test sample 47 having a given width, corresponding to the use of that particular adjusting screw, will be exactly centered between the depending legs of the clamps 48 and 49, when one edge of the test specimen abuts the end of the screw 52. The upper plate 46, which is more or less loosely received in the clamps 48 and 49, should be suitably recessed as at 56 and 57 (see Fig. 2) to provide clearance for the ends of the adjusting screws 52 and 53.

A vertical indexing screw 58 (Fig. 2) is inserted into a vertical hole at one end of the upper plate 46, and projects downwardly into a suitable tapped hole (not shown) in the lower plate 45 to maintain longitudinal alignment between the two plates 45, 46, and also to act as a longitudinal stop when inserting the test sample 47.

Figs. 8, 9 and 10 show in detail the progressive steps in the machining of a strip of metal 47 to specifications for the purpose of testing its tensile, compressive, fatigue or other strengths. For example, with one of the ASTM specifications, it is required that the width of a test sample, at its mid-point should be one-half inch plus or minus .010", and that for a distance of 1⅛" on either side of this mid-point the test sample should have an increased width which tapers upwardly away from the mid-point to an increase of .003" to .005", as is best illustrated in solid lines in Fig. 10. The upper plate 46 is contoured exactly to these dimensions. However, it will be understood as will be seen later, since the master template 44 serves to regulate the amount of metal removed from each side of the test sample 47 as well as act as a pattern, the reduced mid-portion of the upper plate 46, indicated generally by the numeral 59 (Fig. 8), does not have the same dimensions as the finished work.

*Operation*

In operation, the bit 14 which preferably is made of tungsten carbide or other equivalent hard cutting material, is rotated in a counterclockwise direction, as viewed in Figs. 8, 9, and 10, at very high speed (upward of 20,000 r.p.m.). If the test sample 47 is the same width as the distance between the legs of the U-clamps 48 and 49, the centering screws 52 and 53 are not used, and the strip 47 will be inserted in the master template 44 between the upper and lower plates 46 and 45 with one end against the indexing screw 58, and clamped down by the adjustment screws 50 and 51. The adjustment knob 36 is then turned to move the screw 31 inwardly until the bushing 35 comes in contact with the mounting block 32. The cylindrical guide sleeve 27 will then be in its fully "out" position, as shown in Fig. 5.

The operator, with one hand at each end of the master template 44 in the position as shown in Fig. 2, will now move the entire template assembly 44 forward to bring the left hand end of the contoured section of the upper plate 46 into contact with the cylindrical guide sleeve 27, and with a continuous motion will move the template longitudinally past said cylindrical sleeve until the right hand end of the contoured portion is reached, during which motion a small amount of metal will be removed, (Fig. 9). Without changing the position of the knob 36, the master template assembly 44 will be reversed, end for end, and the previous procedure of moving the template assembly from right to left is repeated to remove a small portion of metal from the opposite edge of the strip 47. In Fig. 9, the sample 47 is shown with the first cut having been taken along the lower edge while the bit is in process of making its first cut in the upper edge.

After completing the first cut on both sides of the sample 47, the adjustment knob 36 will be turned to move the adjusting screw 31 counterclockwise, thus moving the cylindrical guide sleeve 27 rearwardly an amount which can be determined by observation of the scale 37. The master template assembly 44 will then again be brought into contact with the guide sleeve 27, and the template assembly moved from right to left, to make a second cut in each side of the sample 47 in the manner previously described for making the first cut.

After further turning the knob 36, the guide sleeve 27 will again be moved inwardly, producing succeeding cuts as indicated by the dotted lines in Fig. 10 in each side of the sample 47, until the guide sleeve 27 has reached its limit of travel. Since the lock nut 34 on the adjusting screw 31 abuts against the block 32, the contour of the sample 47 will be in accordance with the contour of the master template.

In the case of a test sample 47 which is originally of less width than the distance between the legs of the U-clamps 48 and 49, the procedure will be the same, except for the fact that the centering screws 52 and 53 must first be inserted (Fig. 1) for the purpose of insuring that the specimen 47 will be centered under the upper plate 46. In addition, for the first cut of metal to be taken by the bit 14, the knob 36 will be set at a position to retract the guide sleeve 27 rearwardly from its forward limit an amount corresponding to one-half the distance between the width of the sample being machined and a full width sample.

The adjustment furnished by the bushing 35 and the lock nuts 34 regulate within precise limits, the amount of travel of the cylindrical guide sleeve 27, and thus controls the total amount of metal which can be removed by the bit 14 during successive passes across the edge of the test sample 47. Therefore, if the final cut produces a test sample which is too wide, the bolts 17 may be loosened, and the assembly 15 moved to the left an amount equal to one-half of the oversize as viewed in Fig. 4. Similarly, if the final cut by the bit 14 produces a test sample which is too narrow, the assembly 15 must be moved to the right a similar amount.

It will be obvious in any event, that the amount of adjustment of the guide sleeve 27 for successive passes of the bit 14 will depend entirely on the type of material of the test piece 47 and its thickness. Also, any desired scale 37 may be employed, the one shown in Fig. 7 being merely representative of a preferred form. Moreover, the precise form of mounting for the motor 12 and housing 13 being well known forms no part of this invention.

It will be understood that as the surface of the bit 14 becomes dulled, the motor which holds said bit may be raised axially from time to time so as to spread the wear on the bit progressively over its lower surface.

One feature of this invention is that the straight edge bar 20 substantially prevents undesired relative angular movement of the master template 44 with respect to the guide 27, as can be seen from an examination of Fig. 2. The total amount of relative angular movement will not be more than a few degrees, so that for all practical purposes, the upper plate 46 of the master template will always be held substantially tangent to a single point on the surface of the guide sleeve 27 in alignment with the axis of the bit 14.

One advantage of the present machine is that it is extremely light in weight and compact in size, so that it may be carried to any desired location in a laboratory or machine shop.

A further advantage, due to the machining of the test sample with a series of light cuts, is that an extremely smooth edge of microscopic fineness is produced, having a roughness as fine as .000005", which is a measure of the average of the high and low points on said edge.

A still further advantage is that the final light cut may be as small as .0005", which will substantially eliminate cold working of the material on the machined edge, a condition which is extremely desirable for obtaining accurate and uniform results in physical testing.

The ability to machine individual samples or a group of samples rapidly by this invention, with the elimination of delays normally encountered with machine shops, allows research and development programs to be undertaken that were previously considered impossible.

While there has been disclosed in this specification, one form in which the invention may be embodied, it is to be understood that this form is shown for the purpose of illustration only, and that the invention is not limited to this specific disclosure but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a machine for the precision high speed contour milling of test pieces of specific shapes required for the physical testing of metallic and nonmetallic materials within close tolerances with almost complete elimination of cold working and heat distortion, including a supporting table, a high speed motor-driven shaft mounted below said table, said shaft being provided with a rotary routing tool extending upwardly therefrom and projecting through the top of said table with its axis at right angles thereto, a horizontal slideway located above said tabletop in line with said tool, a movable slide in said slideway, a vertical guide sleeve larger in diameter than said tool mounted in said slide and eccentrically embracing said tool, a straight horizontal guide bar rigidly mounted above said table at right angles to said slideway, a micrometer screw mounted on the rear of said slide for permitting the successive manual adjustment of the position of said slide and said sleeve by small increments with respect to said routing tool, and a template having two contoured side edges for receiving the test piece to be machined, said template being smaller in width than the width of the desired finished test piece, said template being adapted to be manually moved longitudinally, repeatedly, with both side contoured edges in contact with said sleeve and said horizontal bar to cause said routing tool to progressively remove small amounts of material from the edges of the test piece carried by said template.

2. The machine as defined in claim 1, in which said horizontal guide bar is spaced slightly above the surface of said table for chip clearance.

3. The machine as defined in claim 1, in which biasing means are provided to positively and automatically urge said slide rearwardly in said slideway, without play.

4. The machine as defined in claim 1, in which adjustable means are provided to positively limit the movement of said micrometer screw, said slide, and said sleeve, in both inward and outward directions in order to prevent said routing tool from coming into contact with said sleeve or said template.

5. The machine as defined in claim 1, in which an adjustable friction member engages the thread of said micrometer screw, to hold it as well as said sleeve and said slide from moving out of adjusted position by vibration.

6. The machine as defined in claim 5, in which a pointer is mounted parallel to said micrometer screw adjacent a graduated scale arranged around the circumference of a hand knob mounted on the rear of said micrometer screw, for permitting the repeated precise manual adjustment of said slide in said slideway.

7. The machine as defined in claim 1, in which said template comprises a pair of contoured sections located above and below the test piece to be machined, and a pair of longitudinally spaced clamps to hold said template sections tightly against said test piece.

8. The machine as defined in claim 1, in which means are provided for vertically adjusting said routing tool when it becomes dull to raise a sharp portion thereof into operating position and to move the dull used portion of said tool inside said sleeve.

9. The machine as defined in claim 1, in which said slideway comprises part of a heavy plate secured to the top of said table.

10. The machine as defined in claim 1, in which said sleeve loosely embraces the top of said tool, and is movable eccentrically forwardly and rearwardly with respect to said tool in response to the movement of said slide in said slideway.

11. The machine as defined in claim 7, in which the contour of said template sections corresponds exactly with the final shape of the test piece to be machined.

12. The machine as defined in claim 7, in which both contoured side edges of the upper template section bear against said sleeve during the operation of machining said test piece.

13. The machine as defined in claim 7, in which said clamps are mounted in U-shaped saddles, only one of which is adapted to contact said horizontal guide bar at one time while said upper template section engages said sleeve, to keep the longitudinal axis of said template substantially tangent to the front edge of said sleeve, said template being movable repeatedly essentially parallel to said guide bar in contact with said sleeve, subsequent to repeated movements of said slide and said sleeve by means of the manual adjustments of said micrometer screw, to cause said routing tool to progressively machine small amounts of material from both side edges of said test piece until the exact contoured shapes of said template are accurately duplicated on said test piece.

References Cited in the file of this patent

UNITED STATES PATENTS

| | | |
|---|---|---|
| 1,821,460 | Cheshire | Sept. 1, 1931 |
| 2,230,292 | Faso | Feb. 4, 1941 |
| 2,317,616 | Jones | Apr. 27, 1943 |
| 2,374,656 | Curle | May 1, 1945 |
| 2,668,568 | Budd | Feb. 9, 1954 |
| 2,773,299 | Mack | Dec. 11, 1956 |